March 4, 1952   W. H. THOMPSON   2,588,178
HOISTING EQUIPMENT
Filed Sept. 1, 1948   3 Sheets-Sheet 1
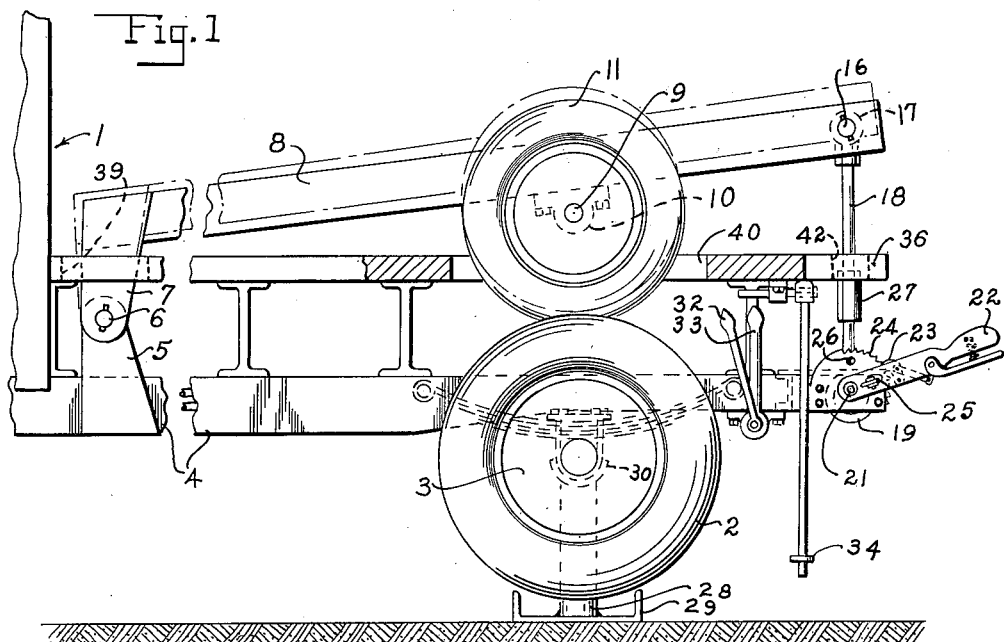
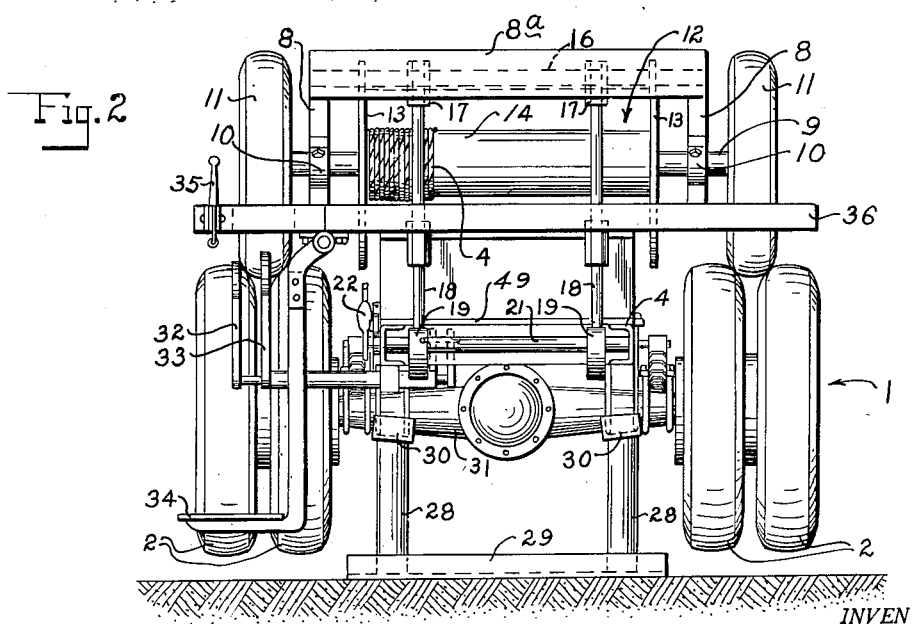
INVENTOR.
William H. Thompson
BY
Wayland D. Keith
HIS AGENT March 4, 1952 W. H. THOMPSON 2,588,178
HOISTING EQUIPMENT
Filed Sept. 1, 1948 3 Sheets-Sheet 2
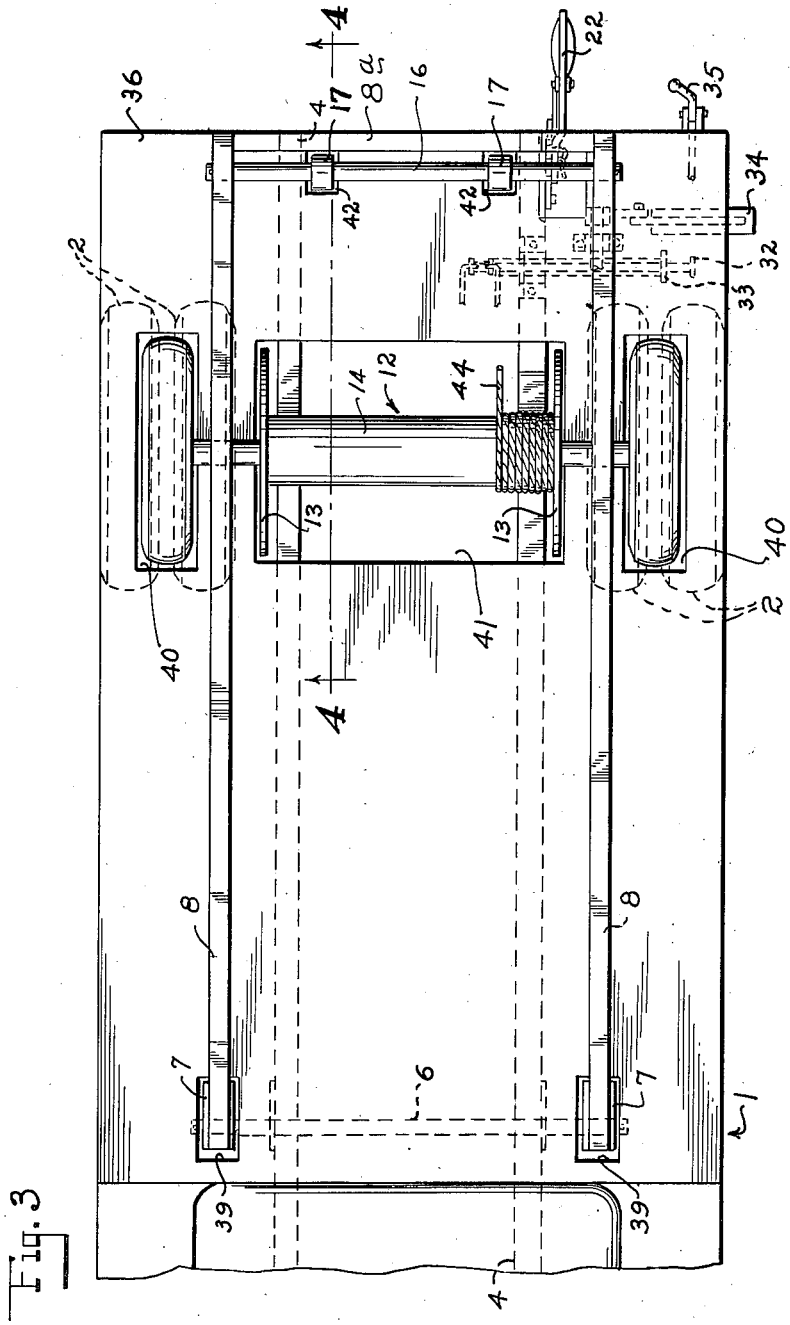
INVENTOR.
William H. Thompson
BY
Wayland D. Keith
HIS AGENT March 4, 1952 — W. H. THOMPSON — 2,588,178
HOISTING EQUIPMENT
Filed Sept. 1, 1948 — 3 Sheets-Sheet 3
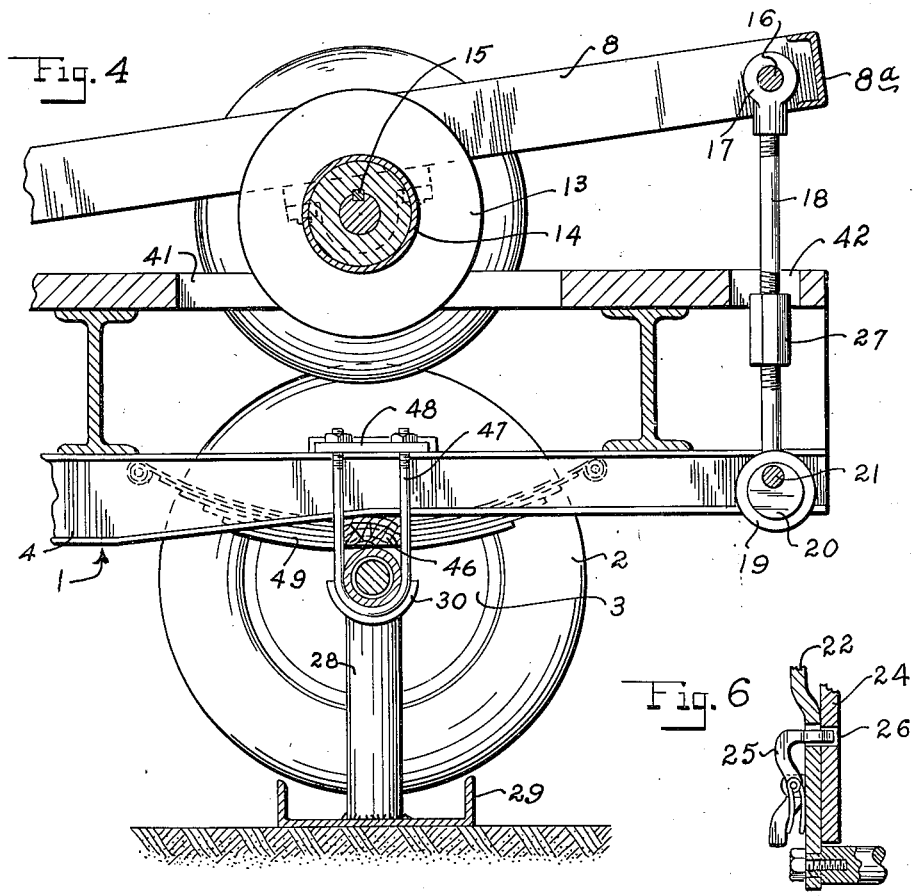
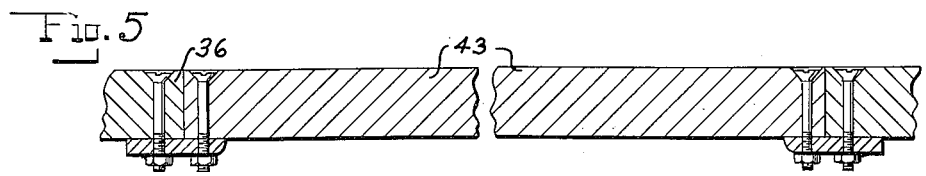
INVENTOR.
William H. Thompson
BY
Wayland D. Keith
HIS AGENT Patented Mar. 4, 1952

2,588,178

UNITED STATES PATENT OFFICE 2,588,178

HOISTING EQUIPMENT

William H. Thompson, Wichita Falls, Tex.

Application September 1, 1948, Serial No. 47,258

4 Claims. (Cl. 254—166)

This invention relates to improvements in hoisting equipment, and more particularly to portable hoisting equipment which may be mounted on and used in conjunction with motor trucks, and which is adapted to be readily attached to and detached from said motor vehicle, so as not to interfere with the regular use of the truck or other motor vehicle when the hoisting equipment is not in use.

Various hoists have been proposed heretofore for use in conjunction with motor vehicles, but these for the most part, have required expensive geared power take-off mechanism, and the hoisting mechanism usually had to be mounted permanently on the truck, which prevented the use of the truck in types of industry not requiring a hoist.

In the present invention the hoisting equipment may be readily attached to or removed from the conventional motor truck in a very short time, and without the necessity of installing a gear driven power take-off transmission, with the wear and expense of upkeep incident thereto.

The primary object of this invention is to provide a hoisting mechanism that operates from a conventional motor vehicle without the necessity of providing an auxiliary geared power take-off mechanism.

Another object of this invention is to provide hoisting mechanism for attachment to a motor vehicle that utilizes the regular transmission and brakes of the vehicle to which it is attached for the operation and control of the hoisting attachment.

A still further object of this invention is to provide hoisting mechanism that is simple in construction and which may be readily attached to or detached from a conventional motor vehicle, so that the vehicle may be put to other uses when not used in combination and without affecting the operability of the vehicle.

Yet another object of this invention is to provide a hoist that is driven by the traction wheels of the motor vehicle and which has only a single moving, driven member and will operate the hoisting mechanism at all desirable speeds.

A still further object of this invention is to provide a hoisting mechanism for a motor vehicle which may be readily controlled from the rear of said vehicle.

With the foregoing object in view and others that will manifest themselves as the description proceeds, references will be had to the accompanying drawings in which:

Fig. 1 is a side elevational view of a motor vehicle with the invention mounted thereon, with parts broken away and shown in section to illustrate details of construction;

Fig. 2 is a rear end elevational view of the motor vehicle showing the hoist mounted thereon, and showing the control members therefor;

Fig. 3 is a top plan view of a portion of a motor vehicle showing the invention applied thereto;

Fig. 4 is a sectional view taken on line 4—4 of Fig. 3, looking in the direction indicated by the arrows;

Fig. 5 is a fragmentary sectional view looking through a portion of the motor vehicle bed, in the direction indicated by the arrows, showing the manner of placement of the floor boards in the cut out portions of the bed when the hoist is removed from the truck; and Fig. 6 is a fragmentary view of the device showing the secondary pawl for holding the hoist control lever in upright or disengaged position.

With more specific reference to the drawings the numeral 1 generally indicates a motor vehicle of the character for transporting heavy loads and which usually has dual tires, as indicated at 2. The tires 2 are mounted on wheels 3 which are driven in the customary manner.

The truck 1 has a frame 4 which extends longitudinally thereof. Upstanding lugs 5 are welded to each side of the frame 4, as indicated in Figs. 1 and 3. Each lug 5 has a hole therethrough to receive a shaft or pin 6 as indicated in Figs. 1 and 3, which enables the connection with a downwardly protruding lug 7, having a complementary hole therein and which downwardly protruding lug 7 is attached as by welding, to the forward end of a hoist frame 8.

The lugs 5 and 7 are inter-connected by a shaft 6 to form a pivotal connection which makes possible the swinging of frame 8 about the pivot shaft 6. A shaft 9 is journaled in bearings 10, which bearings are secured on frame 8 and which enable the free rotation of shaft 9. Wheels 11 are fixedly secured to the shaft 9, as is the hoist drum assembly, generally designated by the numeral 12, so that upon turning of wheels 11, the shaft 9 and drum 12 will rotate in unison. The hoist drum 12 has side flange members 13, and barrel 14 which are secured to shaft 9 by key 15, as will best be seen in Fig. 4.

The frame members 8 have an end member 8a positioned between the rear ends thereof to insure rigidity thereto. Immediately forward of the end member 8a is a transverse shaft 16, which shaft passes through each of the side members 8 and through eyes 17, which eyes 17 are secured to the upper ends of a connecting rod 18. An eye or loop 19 surrounds an eccentric 20, which eccentric is mounted upon a shaft 21 and fixedly secured thereto. The shaft 21 passes through frame members 5 of the truck and is journaled thereon for rotary movement upon the movement of lever 22. The lever 22 is fixedly secured to shaft 21 and carries a pawl 23 adapted to inter-engage rack segment 24 so as to hold frame members 8 in adjusted position. It is preferable to have the pawl 23 and rack segment 24 so arranged that the lever 22 may be moved downwardly without manual manipulation of pawl 23.

A secondary pawl member 25 is resiliently mounted on the lever 22 for engagement with a hole 26 in rack segment 24, which secondary pawl is adapted to hold lever 22 in an upright position to hold the wheels 11 out of engagement with wheels 3 as indicated by the dot dash outline, when the hoisting equipment is not being used or when the cable is being unspooled.

A turnbuckle 27 is provided on connecting rod 18 to enable the adjustment of the effective length thereof, which in turn adjusts the relative spacing between tires of wheels 3 and wheels 11.

A stand or support 28 having a base 29 and an arcuate head 30 is provided to be positioned beneath the rear axle 31 to hold the wheels 2 clear of the ground, as indicated in Figs. 1 and 2. With the wheels thus supported the full driving range of the gears of the motor vehicle transmission may be utilized for shifting into the desired gear to obtain the desired operating speed of the hoist 12 when the wheels 11 are in engagement with tire 2 of wheels 3.

A gear shift lever, and a brake lever 32 and 33, respectively, are provided at the rear end of the truck, as is the clutch pedal 34 and the gasoline control lever 35, which control levers operate as the conventional controls of a motor truck, in the same manner as if the operator were operating them from the conventional driving seat.

By holding the lever 22 to engage wheels 11 with wheels 2 the hoist may be operated in either direction and at desired speeds in the same manner as if the hoisting mechanism was geared to the truck mechanisms by spur or chain gearing. The wheels 11 are so spaced on and secured to shaft 9 that the tires will engage in the valley between the dual tires 2 of the truck which will give a wedging action between the two sets of interengaging tires.

It is preferable to have the frame 8 pivotally mounted on the frame 4 so as to operate independently of the truck bed 36, which relieves the truck bed of strain incident to the operation of the hoisting mechanism. In positioning the hoist frame 8 on the truck frame 9 in this manner, it will be necessary to cut certain holes 39, 40, 41, and 42 through truck body 36 when the winch or hoist is installed thereon. Such holes may be covered by an insert member 43, as shown in Fig. 3, when the hoisting equipment is removed and it is desired to use the motor vehicle for other purposes.

A cable 44 is shown to be wound on the hoisting drum 12 in Figs. 2 and 3. This cable may be wound or unwound on the drum in either direction by the power of the truck as will be more fully explained hereinafter.

In positioning supports 28 below axle 31, it is desirable to place a pair of blocks 46 between frame 4 and axle 31 and a U-bolt member 47 is positioned around the axle and through a plate 48 positioned over the frame 4 so as to draw the frame and axle into a fixed relation so that the springs 49 will not yield when the lever 22 pulls tires 11 into contact relation with tires 2.

*Operation*

In the operation of a motor vehicle of the character described, lugs 5 are welded or otherwise secured to frame 4 and are upstanding therefrom, and have holes in the upwardly extending ends thereof. Lugs 7 are secured to and extend downwardly from frame 8, and have holes in the downwardly extending ends thereof. The lugs 5 and 7 are in position for inter-engagement so that the holes in one set of lugs will register with the holes of the complementary set of lugs and receive a shaft or pin 6 therethrough, as indicated in Figs. 1 and 3. Turnbuckles 27 are connected to connecting rods 28 of frame 4 and to frame 8 of hoist 12.

The lever 22 is normally in upright position, with secondary pawl or latch 25 engaged in hole 26 which normally holds the wheels 11 disengaged from wheels 2. With the wheels 2 jacked up and support 28 positioned there-under, as shown in Figs. 2 and 4, the hoist is now ready for hoisting operation. By the releasing of the pawl 25 from hole 26 the lever 22 may be swung downward as indicated to move wheels 11 from position as indicated in dot-dash outline in Fig. 1, to the full line as indicated therein. With the motor of the truck running and with the transmission shifted into the selected gear the wheels 2 which are in frictional contact with the wheels 11 will turn the wheels 11 at the desired speed and in the desired direction, which will, in turn, rotate hoisting drum 12 to wind cable 44 thereon. When it is desired to brake the hoisting drum 2 the lever 22 remains downward, holding the wheels 11 into secured engagement with tires 2.

If it is desired to unspool the cable under power, the gear shift lever 32 may be shifted to the proper position by a proper manipulation of clutch 34 and by releasing the brake 33 the cable 44 may be unspooled under power; however, if it is desired to unspool the cable 44 under its own weight as in the case of lowering tools or the like into a well, the lever 22 may be lifted upward to disengage tire 11 from tires 2 and very little frictional resistance will be offered by hoist 12, as no back-gearing is connected therewith, and the only frictional resistance offered will be the friction of bearings 10.

It is to be pointed out that upon moving of lever 22 the eccentric 20 will rotate within ring or loop 19; Fig. 4, to raise or lower the frame 8 for disengagement of tires 11 with tires 2.

It is to be further pointed out that the simplicity of construction obviates the complicity of spur or chain gearing and the entire driving connection between hoisting drum 12 and the wheels 2 is the frictional contact between the tires 2 and tires 11.

The invention set forth presents a hoist that is light in weight, strong, and efficient in operation with a minimum of machine parts to get out of order or become worn.

Having thus described the invention what is claimed is:

1. In a hoisting mechanism for a motor vehicle having a frame and wheels, a hoist frame pivoted at one end only, the opposite end of said hoist frame being interconnected to said vehicle frame by means of a connecting rod, an axle journaled transversely of said frame, a pair of wheels positioned on said axle and secured thereto, a hoisting drum mounted on said axle intermediate said wheels and secured to said axle, cam means interconnected with said connecting rod for engaging said wheels of said hoisting mechanism with the wheels of said motor vehicle.

2. In a hoisting mechanism for a motor vehicle having a frame and wheels, a hoist frame pivoted at one end only, the opposite end of said hoist frame being interconnected to said vehicle frame by means of a connecting rod, an axle journaled transversely of said frame, means for detachably securing said frame of said hoisting mechanism to said motor vehicle, a pair of wheels positioned on said axle and secured thereto, a hoisting drum mounted on said axle intermediate said wheels, said drum being secured to said axle, cam means interconnected with said connecting rod for engaging said wheels of said hoisting mechanism with the wheels of said motor vehicle.

3. In a hoisting mechanism for a motor vehicle having a frame and dual drive wheels mounted thereon, a hoist frame, said hoist frame being pivotally mounted at one end to the frame of said vehicle for arcuate swinging movement of said hoisting mechanism relative to the dual wheels of said motor vehicle, an axle journaled transversely of said frame, wheels positioned on said axle and secured thereto and spaced intermediate said dual wheels for engagement thereby, a hoisting drum mounted on said axle and secured thereto intermediate said wheels, means for engaging the wheels of said hoisting mechanism with the dual wheels of said motor vehicle for driving relation therebetween, comprising eccentric means for moving said hoisting mechanism into and out of engagement with the wheels of said motor vehicle.

4. In combination with a motor vehicle having a frame and pairs of dual power driven traction wheels, a hoist mechanism comprising a frame, an axle journaled transversely of said frame, said frame being adapted to be pivotally mounted at one end thereof to the frame of said motor vehicle for arcuate swinging movement of said hoisting mechanism relative to the traction wheels of said motor vehicle, wheels positioned on said axle of said hoisting mechanism and secured thereto, a hoisting drum mounted on said axle and secured thereto intermediate said wheels, means for engaging the wheels of said hoisting mechanism between the dual wheels of said motor vehicle.

WILLIAM H. THOMPSON.

REFERENCES CITED

The following references are of record in the file of this patent:

UNITED STATES PATENTS

| Number | Name | Date |
| --- | --- | --- |
| 1,452,783 | Bishop | Apr. 24, 1923 |
| 1,811,739 | Willis et al. | June 23, 1931 |
| 1,859,711 | Nichols | May 24, 1932 |